Aug. 13, 1935. H. C. DRAKE 2,011,441

TESTING DEVICE FOR MAGNETIZABLE OBJECTS

Filed May 29, 1934

Inventor

Harcourt C. Drake

By Joseph H. Lipschutz

Attorney

Patented Aug. 13, 1935

2,011,441

UNITED STATES PATENT OFFICE 2,011,441

TESTING DEVICE FOR MAGNETIZABLE OBJECTS

Harcourt C. Drake, Hempstead, N. Y., assignor to Sperry Products, Inc., Brooklyn, N. Y., a corporation of New York Application May 29, 1934, Serial No. 728,109

6 Claims. (Cl. 175—183)

This invention relates to a method of and means for detecting internal defects such as fissures within magnetizable objects. More particularly, my invention is adapted for the detection of internal fissures in rails in track. For this purpose I propose to utilize the magnetic method of testing which consists in sending magnetic flux continuously through the rail and detecting by means of an auxiliary solenoid any variations in magnetic flux caused by the presence of internal fissures.

The difficulty with the magnetic method of testing has heretofore been that variations in magnetic flux are caused by other factors besides internal fissures. Thus, for example, hard spots, points of stress, and differences in chemical composition are some of the factors which cause deflection of the magnetic flux to an extent substantially equal to the deflection caused by internal fissures. It was therefore impossible to distinguish between rail defects which it was desired to detect and what may be termed false defects, which in reality were not such defects as would interfere with the utility of the rail or other magnetizable object.

It is the principal object of my invention, therefore, to provide a novel method of and means for detecting fissures by the magnetic method and distinguishing between actual fissures and other unimportant defects such as hard spots, etc. The principles underlying my invention will become apparent in the following detailed description of the invention.

In the accompanying drawing.

Figure 1:
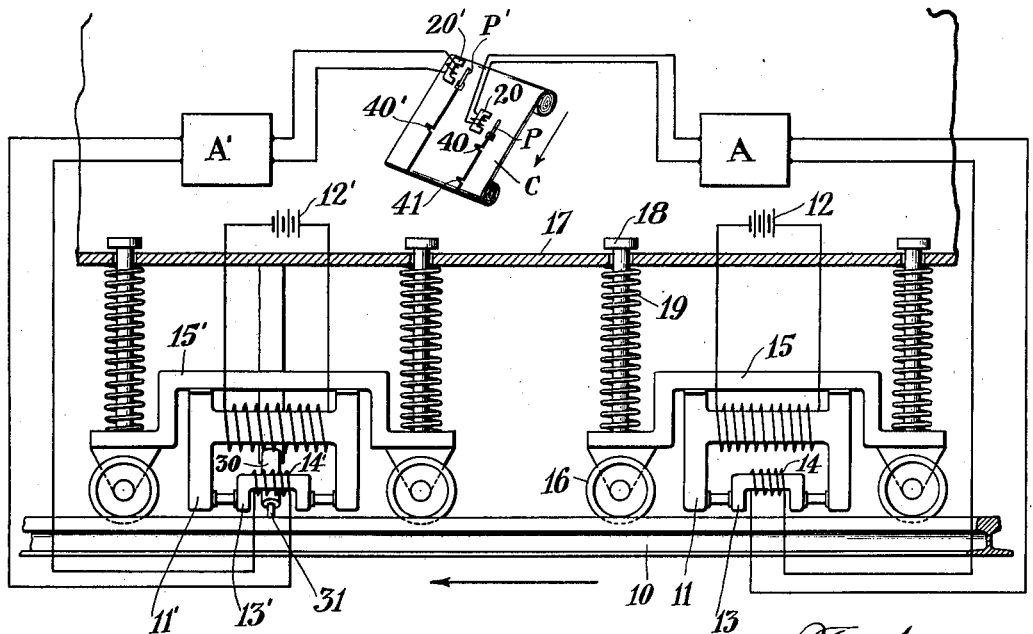
Fig. 1 is a view largely diagrammatic illustrating the principle and mechanism comprising my invention.
Figure 2:
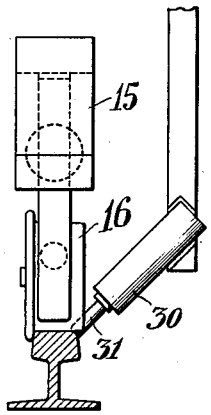
Fig. 2 is an end view of the Fig. 1 device.

While I have shown my invention as applied to the testing of rails, it will be understood that it can be applied to any other magnetizable object. The magnetic method of testing is clearly illustrated in Fig. 1 wherein the rail 10 to be tested is magnetized continuously by means of an electromagnet 11 supplied with current from any suitable source 12, to set up flux axially of the rail. Such flux will be uniform in direction and there will be little or no leakage of flux outside of the rail, except in the region of a flaw where the flux will be distorted to cause a greater leakage of lines of magnetic flux outside the rail and such leakage may be detected by a solenoid 13 having a coil 14. The said solenoid 13 may be mounted to maintain a constant distance above the rail. For this purpose it may be mounted, as shown, on the energizing magnet 11 and said magnet 11 may be in turn mounted upon a carriage 15 adapted to ride upon the rails as by means of wheels 16. The said carriage 15 may in turn be supported upon a car 17 by means such as loosely fitting bolts 18 and springs 19 whereby the carriage 15 may have a movement of its own independent of the car body movement so as to maintain the energizing magnet 11 and the detecting magnet 13 always in constant relation to the rail head. The variations in magnetic flux caused by the presence of a flaw will cause a change in the flux through the core extending through coil 14 and will thus induce an E. M. F. in said coil which after being suitably amplified by amplifier A may be caused to operate a pen P on a travelling chart C. Said pen P will normally trace a straight line longitudinally of the chart but when a flaw occurs the pen will be attracted by magnet 20 operated from the output of amplifier A to cause a jog to be made in the straight line, which will indicate the presence of a flaw.

As stated in the introduction, the magnetic flux is distorted not only by the presence of internal fissures but by such factors as hard spots, points of stress, differences in chemical composition, etc. which are not in reality defects affecting the utility of the rail 10 and therefore it is not desired that these factors shall be detected. Heretofore, all of these factors affected the indicator quite as much as a fissure and it was impossible to tell from the record which of the indications were caused by fissures and which by the other factors. I have discovered, however, that if the rail is subjected to vibration near the point where an internal fissure is located, such fissure will not be detected by the detector magnet 14. The reason for this is that the faces of a fissure which are normally separated are in contact during vibration and therefore there is no displacement of flux. Such vibration, however, does not affect the detection of the extraneous factors such as hard spots, etc. I therefore discovered a method by which I could differentiate between fissures and other extraneous factors when utilizing the magnetic method of testing.

To accomplish this purpose, I provided a second carriage 15' supporting an energizing magnet 11' and detector magnet 13' with detector coil 14', said carriage 15' being mounted either to the front or to the rear of the first magnet. In the drawing, as shown, the auxiliary energizing detector magnet system is mounted ahead of the conventional detector system. Energizing magnet 11' is supplied with current from a suitable source such as 12' to send magnetic flux through the rail in a manner similar to that of magnet 11. Immediately adjacent detector coil 14', I mount a hammer 30 which may be any suitable type such as a pneumatic hammer, the reciprocating member 31 of which is adapted to strike the rail immediately adjacent the detector coil 14'. As a result of this construction, detector coil 14' will not pick up transverse fissures but will detect all other defects such as hard spots, etc., whereas detector coil 14 will detect the transverse fissures as well as hard spots, etc. The coil 14' is connected to an amplifier A', the output of which operates a pen P' by means of magnet 20', said pen P' being displaced longitudinally of chart C from pen P a distance sufficient to compensate for the distance that coil 14' is positioned in advance of coil 14. By this construction, a defect picked up by said coils in succession will appear in line upon the chart. Thus, for instance, the chart shows two indications 40 and 40' opposite one another on Chart C. The operator immediately understands that these indications do not indicate a transverse fissure because detector coil 14' does not pick up transverse fissures. Therefore, the indications 40 and 40' must indicate a hard spot, point of stress, etc. Indication 41, however, made by the pen P has no counterpart on the record made by the pen P'. The operator therefore knows that this indication 41 indicates a transverse fissure because only the coil 14 picked it up and not the coil 14'. By this comparative method of indication the magnetic method of testing becomes practical for the purpose of detecting transverse fissures because it provides a method whereby indications caused by such fissures may be distinguished from indications caused by other extraneous factors such as hard spots, etc., which do not affect the utility of the rail and which it is not desired to detect.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A device for testing magnetizable objects which comprises means for energizing said object with flux, means responsive to variations in said flux, a second means for energizing said object with flux, a second means responsive to variations in said last-named flux, and means adjacent one of said responsive means for vibrating said object.

2. A device for testing rails in track comprising a car adapted to travel on the rails, a plurality of carriages mounted on said car in comparative relation to the rails and arranged in tandem, each carriage comprising means for energizing the rail with flux and means responsive to variations in said flux, and a hammer mounted on said car and adapted to vibrate the rail adjacent one of said responsive means.

3. A device for testing rails in track comprising a car adapted to travel on the rails, a plurality of carriages mounted on said car in comparative relation to the rails and arranged in tandem, each carriage comprising means for energizing the rail with flux and means responsive to variations in said flux, a hammer mounted on said car and adapted to vibrate the rail adjacent one of said responsive means, and a plurality of indicating means adapted to be actuated by the respective responsive means arranged in comparative relation.

4. A method for detecting fissures in magnetizable objects which consists in energizing the object with flux a plurality of times, detecting variations in said flux during each energization, and vibrating the object in the region of detection during one of said energizations.

5. A method for detecting fissures in magnetizable objects which consists in energizing the object with flux, detecting variations in said flux, energizing the object a second time with flux, detecting variations in said last-named flux, and vibrating the object in the region of detection during one of said energizations.

6. A method for detecting fissures in magnetizable objects which consists in energizing the object with flux, detecting variations in said flux, energizing the object a second time with flux, detecting variations in said last-named flux, vibrating the object in the region of detection during one of said energizations, and comparing said variations.

HARCOURT C. DRAKE.